(No Model.)

L. ANDERSON.
NUT LOCK.

No. 384,885.      Patented June 19, 1888.

WITNESSES.
Villette Anderson.
C. L. Ferguson.

INVENTOR.
Lee Anderson,
by E. W. Anderson,
Attorney.

UNITED STATES PATENT OFFICE.

LEE ANDERSON, OF PARIS, TEXAS, ASSIGNOR OF ONE-HALF TO THOMAS BROAD, OF SAME PLACE.

NUT-LOCK.

SPECIFICATION forming part of Letters Patent No. 384,885, dated June 19, 1888.

Application filed February 21, 1888. Serial No. 264,802. (No model.)

*To all whom it may concern:*

Be it known that I, LEE ANDERSON, a citizen of the United States, residing at Paris, in the county of Lamar and State of Texas, have invented certain new and useful Improvements in Nut-Locks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
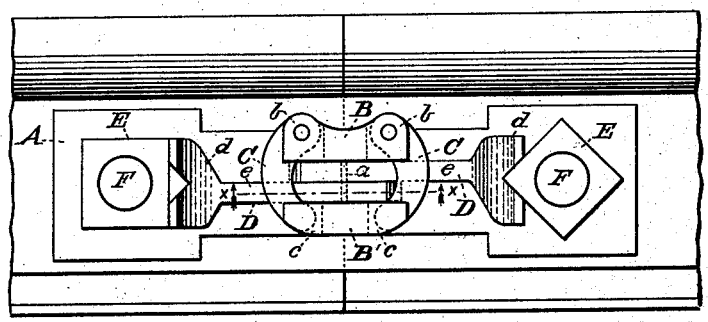
Figure 2:
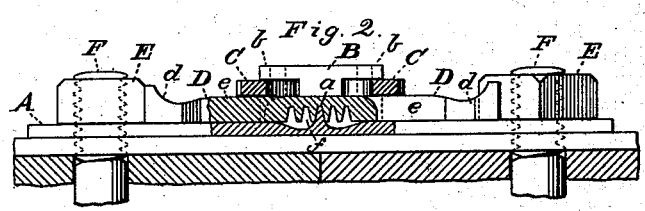
Figure 3:
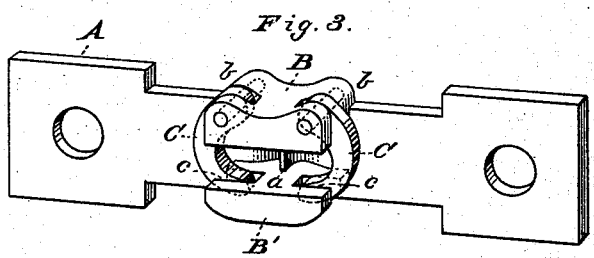
Figure 4:
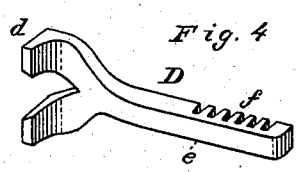

Figure 1 of the drawings is a representation of this invention, and is a front view, and shows the lock attached to the end portions of two railroad-rails. Fig. 2 is partly a bottom view and partly horizontal section. Fig. 3 is a perspective view of the plate portion of the device with its retaining-arms. Fig. 4 is a perspective view of one of the locking-bolts.

The invention relates to improvements in nut-locks; and it consists in the construction and novel combination of parts, as hereinafter specified.

The nut-lock is designed more particularly for rail-connections; but its usefulness is not confined to railroads, as it is evident that it may be used in various places.

Referring to the drawings, A designates a plate.

B B' are outstanding parallel lugs cast integral with said plate, and $a$ represents a detent rising slightly above the plate transversely between the lugs B B'.

C C are retaining-arms pivoted at one end within the bearings $b$ of the lug B, and the free ends, when in a closed position, enter the grooves $c$ in the lug B', said grooves being directly opposite the bearings $b$. In practice the lug B should be placed uppermost, so that the arms C will turn downward on their pivots.

D D are the locking-bolts, having the head portion $d$ designed to bear against the edge of the nut E on the bolt F, as shown. Should the nut be turned to present a corner to the locking-bolt, its corner is engaged by the V-shaped opening in the locking-bolt head. The shank $e$ of the bolts D, on its inner side, is transversely corrugated or notched, as shown at $f$, to engage the detent $a$.

In operation the head portion of the locking-bolts is placed against the nut, the shanks coming between the lugs B B', and the detent $a$ engages one of the several notches $f$. The retaining-arms C are then closed over the shank of the bolts.

In the drawings two bolts are shown locking nuts at the opposite ends of the plate. It is obvious, however, that the locking-bolts may be used singly when so desired.

Having described my invention, what I claim is—

1. In a nut-lock, the plate having the outstanding lugs, the retaining-arms pivoted to one of said lugs, the detent between said lugs, and the locking-bolts having the head portion and the corrugated shank, substantially as specified.

2. The nut-lock consisting of the bearing-lug B, the grooved lug B', the arms C, pivoted to the lug B, the free ends entering the grooves $c$, the detent on the plate, the locking-bolts having the corrugated shank, and the head provided with the V-shaped opening, in combination with the plate, the nut, and the bolt, substantially as specified.

In testimony whereof I affix my signature in presence of two witnesses.

LEE ANDERSON.

Witnesses:
J. C. BATES,
C. E. MORTON.